United States Patent
Haumont et al.

(10) Patent No.: US 7,818,453 B2
(45) Date of Patent: Oct. 19, 2010

(54) ADDRESS TRANSITION AND MESSAGE CORRELATION BETWEEN NETWORKS NODES

(75) Inventors: Serge Haumont, Helsinki (FI); Tuija Hurtta, Espoo (FI); Susanna Kallio, Espoo (FI)

(73) Assignee: Nokia Corporation, Espoo (FI)

( * ) Notice: Subject to any disclaimer, the term of this patent is extended or adjusted under 35 U.S.C. 154(b) by 904 days.

(21) Appl. No.: 10/491,664

(22) PCT Filed: Oct. 4, 2002

(86) PCT No.: PCT/IB02/04079

§ 371 (c)(1),
(2), (4) Date: Apr. 5, 2004

(87) PCT Pub. No.: WO03/032604

PCT Pub. Date: Apr. 17, 2003

(65) Prior Publication Data
US 2004/0243720 A1 Dec. 2, 2004

(30) Foreign Application Priority Data
Oct. 5, 2001 (WO) .................. PCT/EP01/11525
Jan. 15, 2002 (WO) .................. PCT/EP02/00351

(51) Int. Cl.
*G06F 15/16* (2006.01)
(52) U.S. Cl. .............. 709/245; 709/227; 709/228; 709/229; 455/421; 455/432.1; 455/436; 455/439
(58) Field of Classification Search ......... 709/227–229, 709/245; 455/421, 432.1, 436, 439
See application file for complete search history.

(56) References Cited

U.S. PATENT DOCUMENTS
6,172,986 B1   1/2001   Watanuki et al.

(Continued)

FOREIGN PATENT DOCUMENTS
EP   1 093 312 A2   4/2001

(Continued)

OTHER PUBLICATIONS

Korea Information Science Society Review (Seoul, Korea), No English translation is provided.

*Primary Examiner*—Nathan Flynn
*Assistant Examiner*—Mohamed Wasel
(74) *Attorney, Agent, or Firm*—Harrington & Smith

(57) ABSTRACT

A method, system and network element for providing an address transition if a connection point at one end of a connection is changed from a first network node to a second network node of a cellular network is provided. An address information and at least one alternative address information are transmitted in a signaling message from the first network node to the second network node. One of the address information and the alternative address information is selected at the second network node and used for re-establishing the connection towards the other end of the connection. Thereby, the new point of connection is allowed to re-establish the connection towards the other end of the connection, even if it can only communicate using one of the two addresses. Furthermore, signaling messages, e.g. messages relating to charging, lawful interception, and/or customized applications, received from different network nodes can be correlated based on the alternative addresses.

16 Claims, 3 Drawing Sheets

U.S. PATENT DOCUMENTS

| | | | |
|---|---|---|---|
| 6,335,921 B1 * | 1/2002 | Quinquis et al. | 370/331 |
| 6,408,173 B1 * | 6/2002 | Bertrand et al. | 455/406 |
| 2002/0002591 A1 * | 1/2002 | Ketola | 709/206 |
| 2002/0085516 A1 * | 7/2002 | Bridgelall | 370/329 |
| 2002/0147008 A1 * | 10/2002 | Kallio | 455/426 |
| 2003/0043762 A1 * | 3/2003 | Pang et al. | 370/328 |
| 2003/0092390 A1 * | 5/2003 | Haumont | 455/67.1 |
| 2003/0119488 A1 * | 6/2003 | Hans et al. | 455/412 |
| 2003/0152048 A1 * | 8/2003 | Soininen et al. | 370/328 |
| 2003/0219000 A1 * | 11/2003 | Magret | 370/338 |
| 2005/0047351 A1 * | 3/2005 | Orsic | 370/254 |
| 2008/0268850 A1 * | 10/2008 | Narasimha et al. | 455/437 |

FOREIGN PATENT DOCUMENTS

| | | |
|---|---|---|
| WO | WO 00/22839 | 4/2000 |

* cited by examiner

ADDRESS TRANSITION AND MESSAGE CORRELATION BETWEEN NETWORKS NODES

FIELD OF THE INVENTION

The present invention relates to a method, system and network element for providing an address transition, such as a transition from an IPv4 (Internet Protocol version 4) address to an IPv6 address, between a first network node and a second network node of a cellular network, e.g. a GPRS (General Packet Radio Services) network, and/or a message correlation.

BACKGROUND OF THE INVENTION

UMTS (Universal Mobile Telecommunications System) is a more general term for the 3G, (third generation) telecommunications system based on the WCDMA high capacity radio interface. GSM is the most widespread 2G (second generation) telecommunications system based on TDMA (Time Division Multiple Access) radio. The goal of the GPRS system is to provide global layer 2 connectivity from a cellular mobile terminal (MT, sometimes also referred to as mobile station (MS) or user equipment (UE)) using 2G or 3G radio technology (e.g. GSM, American TDMA, UMTS, GERAN (GSM/EDGE Radio Access Network) to an external packet data network. GPRS can support various layer 3 protocols (e.g. IPv4; IPv6; PPP (Point-to-Point Protocol)).

The main nodes of a GPRS network are SGSN (Serving GPRS Support Node) and GGSN (Gateway GPRS Support Node). SGSNs are the nodes serving the MT. Each SGSN supports GPRS for GSM and/or UMTS. GGSNs are the node handling the interworking with PDNs (Packet Data Networks). Signaling and data are exchanged between SGSN and GGSN or SGSN and SGSN using the GTP (GPRS Tunneling Protocol) protocol. GTP protocol handles mobility, and creation, modification and deletion of GTP tunnels, as well as transfer of user data between GSNs. GTP allows multi-protocol packets to be tunneled between GSNs and between an SGSN and the UMTS Terrestrial Radio Access Network (UTRAN, not shown) through which a connection to the concerned MT is established. Other systems components need not be aware of the GTP. Typically, two IP addresses are used for a single tunnel, one for the GTP control message (i.e. signalling) and one for the GTP user packet (i.e. carrying user data).

At GPRS attach, the SGSN establishes a mobility management (MM) context containing information pertaining to e.g. mobility and security for the concerned MT. At PDP context activation, the SGSN establishes a PDP context, to be used for routing purposes, with the GGSN the subscriber will be using A GPRS attached mobile terminal (MT) can be assigned either a static or dynamic IP address (referred to also as PDP address). The static address is assigned by the Home Public Land Mobile Network (HPLMN) operator at the time of subscription. The dynamic IP address can be allocated by a GGSN (Gateway GPRS Support Node) of either the HPLMN or the visited PLMN (VPLMN) operator at PDP (Packet Date Protocol) context activation time. In addition to address allocation, the GGSN implements the forwarding of IP packets from a GTP (GPRS Tunneling Protocol) tunnel to a packet data network (PDN) and vice versa. There are two kinds of PLMN backbone networks, an Intra-PLMN backbone network and an Inter-PLMN backbone network. The Intra-PLMN backbone network is a private IP network intended for packet domain data and signaling within a PLMN only, while the Inter-PLMN backbone is used for roaming from one PLMN to another (via Border Gateways). Serving GPRS Support Nodes (SGSNs) and GGSNs use the Intra-PLMN backbone to exchange GPRS domain data and signalling.

During roaming, both the Intra-PLMN backbone of the home and visited networks are used in addition to the Inter-PLMN backbone. When a subscriber is roaming to another PLMN, i.e. a VPLMN, the user needs to first attach to the network. In GPRS attach, the MT informs the Serving SGSN of its intention to connect to the network by giving information about its identity, capability and location. The SGSN then checks the MT's identity and performs an authentication procedure in order to secure the transmission path. The attachment is completed after the SGSN has received roaming subscriber data from the Home Location Register (HLR) of the subscriber's HPLMN and finished a location update procedure. After the GPRS attach, the MT sends an 'Activate PDP context' request, in which the Access Point Name (APN) is a reference to the GGSN Access Point (AP) to be used in either the home or visited PLMN. The SGSN selects the GGSN based on a PDP context subscription record and sends the context data to a selected GGSN. The GGSN then routes the packets to the appropriate Packet Data Networks (PDN).

When a subscriber is roaming in the VPLMN, there are the following two possibilities for GGSN selection. Firstly, the home network GGSN can be used via the Inter-PLMN backbone and BGs. The home GGSN then routes the packets to their destination. Secondly, a visited domain GGSN can be used for routing the packets from the VPLMN to their destination directly through a packet data network (PDN), such as the public Internet.

It should be noted that there are two levels of IP addressing:
the user IP address corresponding to the packets carried over GTP protocol. The corresponding IP address is referred to as PDP address or user address; and
the network IP address corresponding to the packets carried below GTP protocol. The corresponding IP addresses are the node IP addresses used to exchange GTP packets between GSNs. These IP addresses might also be used for network operation such as charging or O&M.

User and network addresses are independent of each other thanks to the GTP protocol, and could both be either IPv4 or IPv6.

The GPRS backbone nodes of the second (2G) and third (3G) generation may optionally use an IPv6 based addressing for network addresses. However, existing specifications allowing the use of IPv6 addresses, do not define how to maintain backward compatibility with IPv4 based nodes. An SGSN should know in advance that the GGSN selected supports IPv6 addresses before inserting an IPv6 address e.g. in a create PDP context request message.

Furthermore, another problem arises with the known procedures. If a MT moves from an IPv6 capable SGSN connected to an IPv6 capable GGSN to an IPv4 only SGSN, the communication will get lost as the new SGSN cannot use the IPv6 address transferred. Such a scenario is very realistic in particular when two operators with equipment from different manufacturers (or just different software release) have roaming agreements (e.g. national roaming). It should be noted that existing IPv4-to-IPv6 transition mechanisms do not apply here as they do not affect IP addresses carried in GTP.

In addition, a practical requirement is that the protocol changes have to be done so that nodes based on older version of specifications (and so not supporting enhancement proposed here), have to continue interworking with new nodes supporting the proposed enhancement proposed here.

SUMMARY OF THE INVENTION

It is therefore an object of the present invention to provide a method and system for providing an address transition or correlation function, by means of which backward address compatibility can be achieved.

Accordingly, if one of the point of connection is changed (e.g. Inter SGSN Routing area update; Serving RNC relocation), the old point of connection (e.g. old SGSN) shall send to the new point of connection (e.g. new SGSN) both first and second address, in order to allow the new point of connection to re-establish the connection towards the other end of the connection (GGSN), even if it can only communicate using one of the 2 addresses.

Furthermore, signaling messages, e.g. messages relating to charging, lawful interception, and/or customized applications (e.g. Customized Applications for Mobile network Enhanced Logik (CAMEL) architecture), received from different network nodes can be correlated based on the alternative addresses.

Advantageous further developments are defined in the dependent claims.

BRIEF DESCRIPTION OF THE DRAWINGS

In the following, the present invention will be described in greater detail based on a preferred embodiment with reference to the accompanying drawings, in which.

DESCRIPTION OF THE PREFERRED EMBODIMENTS

Figure 1:
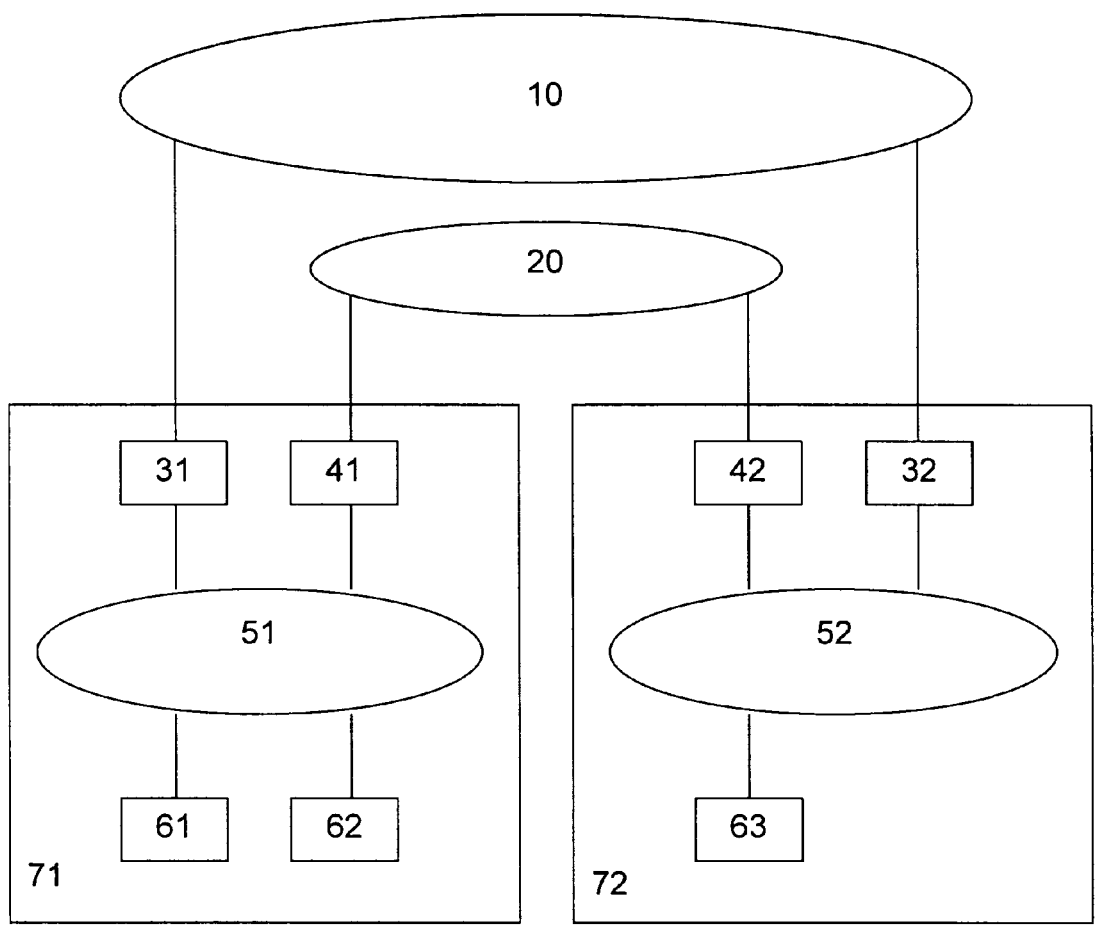
FIG. 1 shows a schematic block diagram of a GPRS backbone network architecture, in which the present invention can be implemented.

The preferred embodiment will now be described based on a packet domain PLMN backbone network architecture as indicated in FIG. 1, in which an IPv6 to IPv4 address transition mechanism is used.

According to FIG. 1, a packet data network (PDN) 10 (e.g. an IP network) is connected via a first GGSN 31 to a first PLMN 71 comprising a first Intra-PLMN backbone network 51. Furthermore, the first PLMN 71 includes at least a first SGSN 61 and a second SGSN 62 connected to each other and to the first GGSN 31 through the first Intra-PLMN backbone network 51. Additionally, the PDN 10 is connected to each other via a second GGSN 32 to a second PLMN 72 comprising a second Intra-PLMN backbone network 52. Furthermore, the second PLMN 72 includes at least a third SGSN 63 connected to the second GGSN 32 through the second Intra-PLMN backbone network 52. The first and second PLMNs 71, 71 are connected to each other via an Inter-PLMN backbone network 20. The connection between the first PLMN 71 and the Inter-PLMN backbone network 20 is provided through a first border gateway (BG) 41. Similarly, the connection between the second PLMN 72 and the Inter-PLMN backbone network 20 is provided through a second BG 42.

Each of the Intra-PLMN backbone networks 51, 52 may be a private IP network intended for packet domain data and signaling. A private IP network is an IP network to which some access control mechanism is applied in order to achieve a required level of security. The Inter-PLMN backbone network 20 can be packet data network, e.g. the public Internet or a leased line, which may be selected by a roaming agreement including a BG security functionality (i.e. typically just a router with security functions). The first and second BGs 41, 42 are not defined within the scope of the packet domain.

The GPRS Support Nodes (GSNs), i.e. the first to third SGSNs 61 to 63 and the first and second GGSNs 31, 32, contain functionality required to support GPRS functionality for GSM (Global System for Mobile communication) and/or UMTS. In particular, the first and second GGSNs 31, 31 represent network nodes which are accessed by the PDN 10 due to evaluation of the PDP address. It contains routing information for GPRS attached users: The routing information is used to tunnel packet data units (PDUs) to the MT's current point of attachment, i.e. the respective Serving SGSN. Thus, the first and second GGSNs 31, 32 are the first point of PDN interconnection with the first and second PLMNs 71, 72, respectively. The first to third SGSNs 61 to 63 represent nodes for serving the MT. Each SGSN supports GPRS for GSM and/or UMTS.

Further details regarding the network architecture and signaling procedures can be gathered from the 3GPP (3rd Generation Partnership Project) specification TS 23.060 Release 4.

According to the preferred embodiment, an SGSN willing to use an IPv6 addressing will always indicate IPv6 and also IPv4 SGSN addresses in a respective GTP signaling message used to request creation of a GTP tunnel to the selected GGSN. Optionally, the SGSN may also indicate IPv6 and also IPv4 SGSN addresses in a respective GTP signaling message used to request update of a GTP tunnel. But this is not necessary if before sending the update, the SGSN already knows the type of addresses supported by GGSN. It may however be useful if the operator like to configure on a node by node basis the technology to be used (may be due to intermediate network).

If the selected GGSN supports IPv6 in the network plane, it shall also indicate IPv6 addresses in the corresponding GTP response message together with IPv4 addresses. The IPv4 addresses are stored in the SGSN and not used for transmission. IPv6 addresses are used for transmission on the network plane. In case of an inter SGSN handover, IPv4 and IPv6 addresses shall be given to the new SGSN in a backward compatible way. If the new SGSN does not support IPv6 addresses, it uses the obtained IPv4 addresses to update the tunnel towards the GGSN. Also the GGSN may start receiving user data from the new SGSN before the tunnel has been updated. Therefore the first and second GGSNs 31, 32 shall be ready to receive GTP packets (signaling or user data) on either IPv4 or IPv6 addresses.

It should be noted, that in future a new SGSN may be provided, which is capable of using only IPv6 on network plane, and same principles would apply.

As an implementation alternative, the node could select the transmission technology (IPv4 or IPv6) to be used based on operator configuration If the selected GGSN does not support IPv6 in the network plane, it indicates only IPv4 addresses in the corresponding GTP response message. IPv4 addresses are then used for transmission on the network plane as currently defined.

Because it is proposed to send the IPv6 address as a new optional information element, backward compatibility can be provided so as to introduce IPv6 in future network nodes and maintain connections on the network plan even if a new SGSN supports only IPv4.

In the following, examples for specific signaling messages and the incorporation of a specific address field for transmitting an alternative address will be described with reference to FIGS. 2 and 3. Specific details regarding the signaling messages and procedures can be gathered from the 3GPP specifications TS 29.060 and TS 23.060 Release 4.

A Create PDP Context Request is sent from a SGSN node to a GGSN node as a part of the GPRS PDP Context Activation procedure. A valid request initiates the creation of a tunnel between a PDP Context in a SGSN and a PDP Context in a GGSN. If the SGSN prefers to use IPv6 below GTP, it include the IPv6 addresses in new message fields Alternative SGSN Address, and an alternative or equivalent IPv4 address in existing message fields SGSN address. If the GGSN supports IPv6 below GTP, it stores and uses the alternative IPv6 SGSN addresses for communication with the SGSN. If the GGSN supports only IPv4 below GTP, it stores and uses the IPv4 SGSN addresses for communication with the SGSN. The SGSN accepts packets whether they are sent to its IPv4 or IPv6 address. The GGSN should not store SGSN IP addresses that it does not use. This mechanism provides maximum flexibility, as it is not based on special DNS features, and allows the GGSN to have processes using IPv4 only and processes using both IPv4 and IPv6.

The following Table 1 shows the specific information elements provided in the Create PDP Context Request message.

TABLE 1

| Information element | Presence requirement |
| --- | --- |
| IMSI | Conditional |
| Recovery | Optional |
| Selection mode | Conditional |
| Tunnel Endpoint Identifier Data | Mandatory |
| Tunnel Endpoint Identifier Control Plane | Conditional |
| NSAPI | Mandatory |
| Linked NSAPI | Conditional |
| Charging Characteristics | Optional |
| Trace Reference | Optional |
| Trace Type | Optional |
| End User Address | Conditional |
| Access Point Name | Conditional |
| Protocol Configuration Options | Conditional |
| SGSN Address for signalling | Mandatory |
| SGSN Address for user traffic | Mandatory |
| Alternative SGSN Address for signalling | Optional |
| Alternative SGSN Address for user traffic | Optional |
| MSISDN | Conditional |
| Quality of Service Profile | Mandatory |
| TFT | Conditional |
| Trigger Id | Optional |
| OMC Identity | Optional |
| Private Extension | Optional |

The Create PDP Context Response message is sent from the GGSN node to the SGSN node as a response of a Create PDP Context Request. When the SGSN receives the Create PDP Context Response with the Cause value indicating 'Request Accepted', the SGSN activates the PDP context and may start to forward PDUs to/from the MT from/to the external data network.

If the GGSN supports IPv6 below GTP, and the SGSN included an IPv6 SGSN address in the request, the GGSN shall include the IPv6 addresses in the new fields Alternative GGSN Address, and an equivalent IPv4 address in the fields GGSN address. The SGSN uses the alternative IPv6 GGSN addresses for communication with the GGSN, except if the operator has configured the use of IPv4. The SGSN stores the GGSN addresses and sends them to a new SGSN in a PDP context response message (message sent by old-SGSN to new SGSN, after an MS has performed a Routing area update procedure to a new SGSN, that the new SGSN has sent a PDP context request message to the old SGSN). The GGSN shall accept packets whether they are sent to its IPv4 or IPv6 address. This mechanism avoids losing connection if the new SGSN support IPv4 only below GTP.

Table 2 shows specific information elements provided in the Create PDP Context Response message.

TABLE 2

| Information element | Presence requirement |
| --- | --- |
| Cause | Mandatory |
| Reordering required | Conditional |
| Recovery | Optional |
| Tunnel Endpoint Identifier Data | Conditional |
| Tunnel Endpoint Identifier Control Plane | Conditional |
| Charging ID | Conditional |
| End User Address | Conditional |
| Protocol Configuration Options | Optional |
| GGSN Address for Control Plane | Conditional |
| GGSN Address for user traffic | Conditional |
| Alternative GGSN Address for Control Plane | Conditional |
| Alternative GGSN Address for user traffic | Conditional |
| Quality of Service Profile | Conditional |
| Charging Gateway Address | Optional |
| Private Extension | Optional |

Furthermore, an Update PDP Context Request message is sent from a SGSN to a GGSN as part of the GPRS Inter SGSN Routing Update procedure or the PDP Context Modification procedure or to redistribute contexts due to load sharing. The SGSN may use SGSN IPv6 addresses only if it has received an IPv6 GGSN address from an old SGSN (Inter SGSN Routing Area Update case) or GGSN (PDP context modification). Otherwise SGSN uses SGSN IPv4 addresses.

If the GGSN supports IPv6 below GTP, and the SGSN included an IPv6 SGSN address in the request, the GGSN includes the IPv6 addresses in the fields Alternative GGSN Address, and an equivalent IPv4 address in the fields GGSN address. The SGSN uses the alternative IPv6 GGSN addresses for communication with the GGSN. The SGSN may store both IPv4 and IPv6 GGSN addresses and send them to a new SGSN in PDP context response message. The GGSN alternative address fields are not sent if the GGSN address field is not sent. This mechanism guarantees that the SGSN always stores proper IPv4 and IPv6 GGSN addresses, so that connection will not be lost if moving to a new SGSN supporting only IPv4 below GTP.

In the following Table 3, specific information elements in the Update PDP Context Response message are shown.

TABLE 3

| Information element | Presence requirement |
| --- | --- |
| Cause | Mandatory |
| Recovery | Optional |
| Tunnel Endpoint Identifier Data | Conditional |
| Tunnel Endpoint Identifier Control Plane | Conditional |
| Charging ID | Conditional |
| GGSN Address for Control Plane | Conditional |
| GGSN Address for User Traffic | Conditional |
| Alternative GGSN Address for Control Plane | Conditional |
| Alternative GGSN Address for user traffic | Conditional |
| Quality of Service Profile | Conditional |
| Charging Gateway Address | Optional |
| Private Extension | Optional |

Furthermore, as regards the SGSN Context Request message, the new SGSN sends this message to the old SGSN to get the mobility management (MM) and PDP Contexts for the MT. The old SGSN responds with an SGSN Context Response.

The new SGSN adds an SGSN Address for the control plane. If the new SGSN supports IPv6 below GTP, it adds its IPv6 address in the field Alternative SGSN Address for Control Plane. The old SGSN then selects the SGSN address for Control Plane depending on its IPv6 supports, and stores this selected SGSN Address and uses it when sending control plane messages for the MT to the new SGSN in the SGSN context transfer procedure.

Table 4 shows specific information elements provided in the SGSN Context Request message.

TABLE 4

| Information element | Presence requirement |
| --- | --- |
| IMSI | Conditional |
| Routing Area Identity (RAI) | Mandatory |
| Temporary Logical Link Identifier (TLLI) | Conditional |
| Packet TMSI (P-TMSI) | Conditional |
| P-TMSI Signature | Conditional |
| MS Validated | Optional |
| Tunnel Endpoint Identifier Control Plane | Mandatory |
| SGSN Address for Control Plane | Mandatory |
| Alternative SGSN Address for Control Plane | Conditional |
| Private Extension | Optional |

The old SGSN sends an SGSN Context Response message to the new SGSN as a response to a previous SGSN Context Request. The old SGSN may use SGSN IPv6 addresses only if it received IPv6 SGSN address from the new SGSN. Otherwise SGSN shall use SGSN IPv4 addresses.

The new SGSN sends an SGSN Context Acknowledge message to the old SGSN as a response to the SGSN Context Response message. Only after receiving the SGSN Context Acknowledge message, the old SGSN starts to forward user data packets. SGSN Context Acknowledge indicates to the old SGSN that the new SGSN has correctly received PDP Context information and is ready to receive user data packets.

The new SGSN uses an SGSN Address for user traffic, which may differ from that provided by the underlying network service (e.g. IP). The old SGSN stores this SGSN Address and uses it when sending downlink PDUs to the new SGSN for the MT. The SGSN may use IPv6 addresses only if it received IPv6 SGSN address for control plane from the old SGSN. Otherwise the SGSN use SGSN IPv4 addresses.

Figure 2:
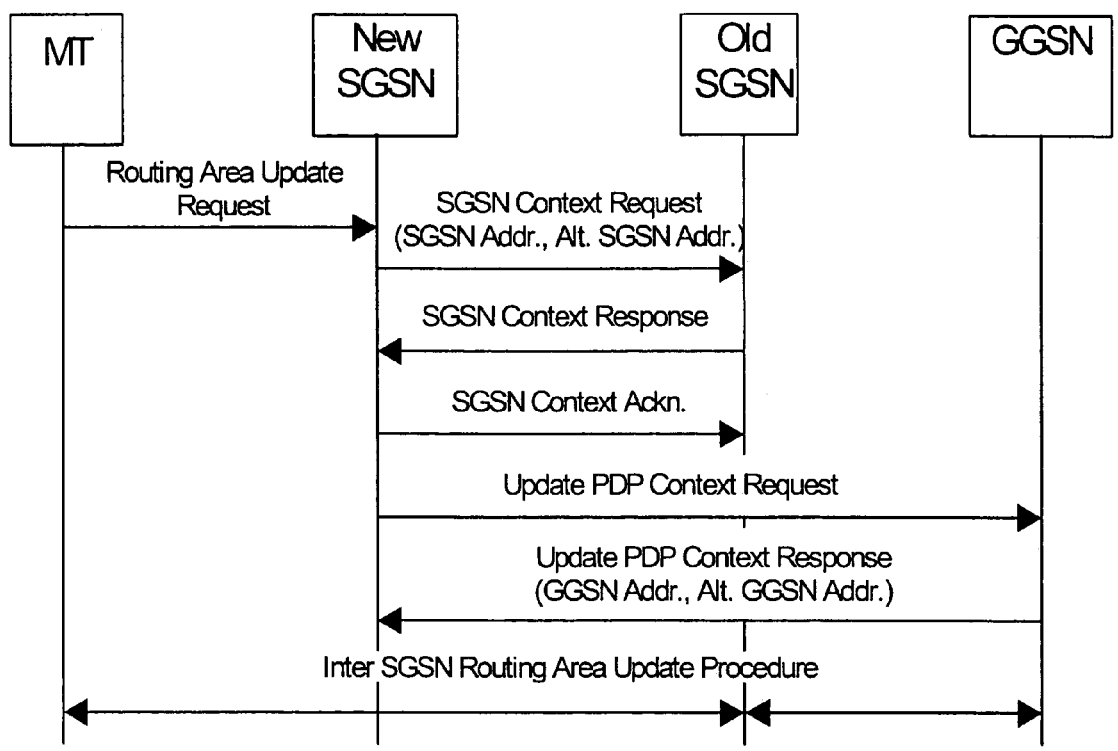
FIG. 2 shows a signaling diagram indicating an Inter-SGSN routing area update procedure according to the preferred embodiment.

FIG. 2 shows a signaling diagram indicating an Inter-SGSN routing area update procedure according to the preferred embodiment.

In this signaling example, the MT sends a Routing Area Update Request to a new SGSN, so as to initiate a routing area update. In response thereto, the new SGSN sends an SGSN Context Request message including the SGSN Address fields and the Alternative SGSN Address fields to the old SGSN. In response thereto, the old SGSN returns an SGSN Context Response message in which the desired address type is set in the SGSN Address for Control Plane fields, and all GGSN IPv4 and IPv6 addresses are included if available. The new SGSN responds with an SGSN Context Acknowledge message including the used address type information. Then, the new SGSN sends an Update PDP Context Request message including the set address type information to the respective GGSN. This message is sent using a GGSN IP address received from old SGSN. If the new SGSN and GGSN support IPv6 on the network plane, the IPv6 address of GGSN is preferably used. If either SGSN or GGSN does not support IPv6, IPv4 addresses are used. Here, it is assumed that in a first phase of transition towards IPv6, all nodes support IPv4. The GGSN returns an Update PDP Context Response message including the GGSN Address fields and the Alternative GGSN Address fields. These address fields are especially necessary in the following cases:

The old SGSN supported only IPv4, and had not stored the alternative GGSN address, so that the new SGSN needs to receive it from GGSN to be able to use IPv6 for the connection The GGSN has changed its IP address (typically due to a reallocation of the PDP context to a new processing card)

In addition, if for some reason, the GGSN is configured to use. IPv4 to communicate towards the new SGSN (due to possible problem in intermediate IP network), the GGSN will return only the IPv4 addresses and will not send an alternative address field containing the IPv6 address.

Finally, the required routing area update procedure is performed.

As a further GTP signalling message, a Forward Relocation Request message is defined, which is sent by an old SGSN to a new SGSN to convey necessary information to perform an SRNS (Serving Radio Network Subsystem) relocation procedure between the new SGSN and a target RNC (Radio Network Controller) of the UTRAN. In this case, the old SGSN adds an SGSN Address for Control Plane field information. If the old SGSN supports IPv6 below GTP, it adds its IPv6 address in this field Alternative SGSN Address for Control Plane. The new SGSN selects the SGSN address for Control Plane depending on its IPv6 supports, and stores this selected SGSN address and uses it when sending control plane messages for the MT to the old SGSN in the SRNS relocation procedure.

Table 5 shows specific information elements provided in the Forward Relocation Request message.

TABLE 5

| Information element | Presence requirement |
| --- | --- |
| IMSI | Mandatory |
| Tunnel Endpoint Identifier Control Plane | Mandatory |
| RANAP Cause | Mandatory |
| MM Context | Mandatory |
| PDP Context | Conditional |
| SGSN Address for Control plane | Mandatory |
| Alternative SGSN Address for Control plane | Optional |
| Target Identification | Mandatory |
| UTRAN transparent container | Mandatory |
| Private Extension | Optional |

The new SGSN sends a Forward Relocation Response message to the old SGSN as a response to a previous Forward Relocation Request message. The new SGSN adds an SGSN Address for Control Plane information. The SGSN may insert IPv6 addresses only if it received an IPv6 SGSN address for control plane from the old SGSN. Otherwise the new SGSN uses SGSN IPv4 addresses. The old SGSN stores this SGSN address and uses it when sending control plane messages for the MT to the new SGSN in the SRNS relocation procedure.

Figure 3:
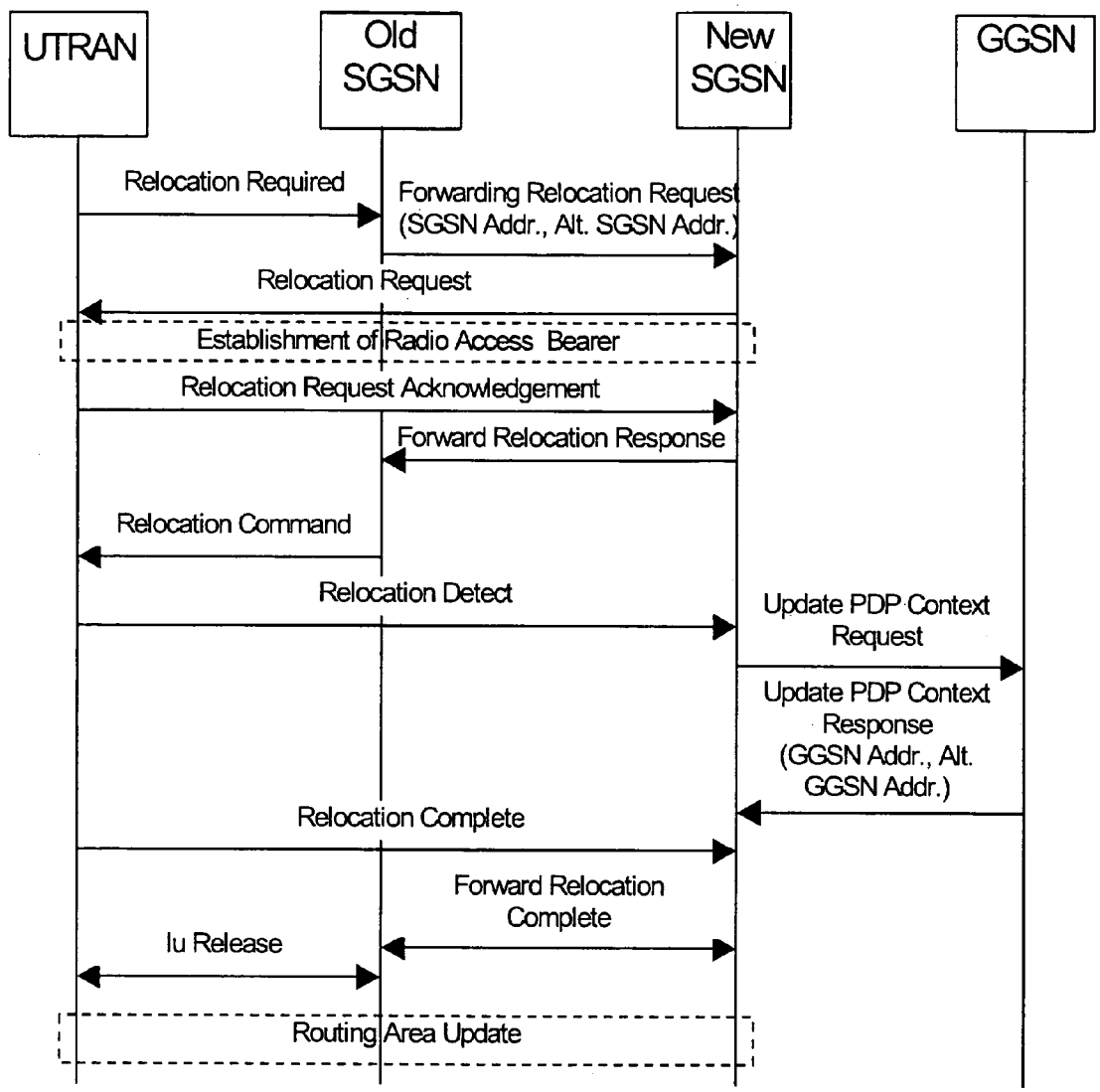
FIG. 3 shows a signaling diagram indicating a Serving SRNS Relocation procedure according to the preferred embodiment.

FIG. 3 shows a signaling diagram indicating an SRNS (Serving Radio Network Subsystem) relocation procedure according to the preferred embodiment.

In this signaling example, a source SRNS of the UTRAN decides to perform or initiate an SRNS relocation and sends a Relocation Required message to the old SGSN. In response thereto, the old SGSN determines if the SRNS relocation is an inter-SGSN SRNS relocation and, if so, it sends a Forward Relocation Request message including the SGSN Address field and the Alternative SGSN Address field for control plane signaling to the respective new SGSN. In response thereto, the new SGSN send a Relocation Request message to the target Radio Network Controller (RNC) of the UTRAN. Then, the Iu bearers of the radio access bearers (RABS) are setup between the target RNC and the new SGSN as the existing radio bearers will be reallocated between the MT and the target RNC when the target RNC takes the role of the Serving RNC in the new SRNS. After the new SGSN has received the Relocation Request Acknowledgement message from the UTRAN, the GTP tunnels are established between the target RNC and the new SGSN. Then, the Forward Relocation Response message is sent from the new SGSN to the old SGSN to thereby indicate that the target RNC is ready to receive from the source SRNC (Serving RNC) of the SRNS the forwarded packet data units (PDUs). The old SGSN continues the SRNS relocation by sending a Relocation Command message to the source SRNC. The source SRNC is now ready to forward downlink user data directly to the target RNC. When the data forwarding is completed, the target RNC send a relocation Detect message to the new SGSN. In response thereto, the new SGSN sends an Update PDP Context Request message to a concerned GGSN. The GGSN returns an Update PDP Context Response message including the GGSN Address fields and the Alternative GGSN Address fields. When the new SGSN receives a Relocation Complete message from the SRNC, a Forward Relocation Complete signaling is exchanged between the new and the old SGSNs, and then the old SGSN initiates an Iu release procedure at the SRNC. Finally, if the new Routing Area Identification is different, the MT initiates a Routing Area Update procedure.

Furthermore, a PDP Context information element contains the Session Management parameters, defined for an external packet data network address, that are necessary to transfer between SGSNs at the Inter SGSN Routing Area Update procedure.

If the GGSN negotiated the use of IPv6 below GTP with the old SGSN, the old SGSN sets Alternative GGSN Address for User Traffic and Alternative GGSN Address for Control Plane fields to contain the IPv6 addresses to be used to communicate with the GGSN. A new SGSN not supporting IPv6 below GTP ignores these alternative GGSN addresses, and uses for communication the GGSN Address for User Traffic and GGSN Address for Control Plane fields. A new SGSN supporting IPv6 below GTP stores the GGSN Address for User Traffic and GGSN Address for Control Plane, but uses use for communication the Alternative GGSN Address for User Traffic and Alternative GGSN Address for Control Plane.

In Table 6, a PDP Context information field is shown.

TABLE 6

| 1 | Type = 130 (Decimal) | | | | |
|---|---|---|---|---|---|
| 2-3 | Length | | | | |
| 4 | Re-served | VAA | Re-served | Order | NSAPI |
| 5 | X | X | X | X | SAPI |
| 6 | QoS Sub Length | | | | |
| 7 – (q + 6) | QoS Sub [4 . . . 255] | | | | |
| Q + 7 | QoS Req Length | | | | |
| (q + 8) – (2q + 7) | QoS Req [4 . . . 255] | | | | |
| 2q + 8 | QoS Neg. Length | | | | |
| (2q + 9) – (3q + 8) | QoS Neg [4 . . . 255] | | | | |
| (3q + 9) – (3q + 10) | Sequence Number Down (SND)[1)] | | | | |
| (3q + 11) – (3q + 12) | Sequence Number Up (SNU)[1)] | | | | |
| 3q + 13 | Send N-PDU Number[1)] | | | | |
| 3q + 14 | Receive N-PDU Number[1)] | | | | |
| (3q + 15) – (3q + 18) | Uplink Tunnel Endpoint Identifier Control Plane | | | | |

TABLE 6-continued

| (3q + 19) – (3q + 22) | Uplink Tunnel Endpoint Identifier Data I | |
|---|---|---|
| 3q + 23 | PDP Context Identifier | |
| 3q + 24 | Spare<br>1 1 1 1 | PDP Type<br>Organisation |
| 3q + 25 | PDP Type Number | |
| 3q + 26 | PDP Address Length | |
| (3q + 27) – m | PDP Address [1 . . . 63] | |
| M + 1 | GGSN Address for control plane Length | |
| (m + 2) – n | GGSN Address for control plane [4 . . . 16] | |
| N + 1 | GGSN Address for User Traffic Length | |
| (n + 2) – o | GGSN Address for User Traffic [4 . . . 16] | |
| O + 1 | APN length | |
| (o + 2) – p | APN | |
| P + 1 | Spare (sent as 0 0 0 0) | Transaction Identifier |
| P + 2 | Transaction Identifier<br>Alternative GGSN Address for control plane Length<br>Alternative GGSN Address for control plane [4 . . . 16]<br>Alternative GGSN Address for User Traffic Length<br>Alternative GGSN Address for User Traffic [4 . . . 16] | |

If having either IPv6 or IPv4 address in GGSN Address for Control Plane is allowed, GGSN Address for Control Plane of the PDP context information field may sometimes be an IPv6 address and sometimes an IPv4 address during an active PDP context. This may happen e.g. if GGSN indicates IPv6 address in GGSN Address for Control Plane and IPv4 address in Alternative GGSN Address for Control Plane at PDP context activation, whereas an old SGSN indicates IPv4 address in GGSN Address for Control Plane to a new SGSN at routing area update. In this case, GGSN Address for Control Plane is the same in GGSN and old SGSN, whereas GGSN Address for Control Plane is different in new SGSN. In this case, e.g. charging correlation by using GGSN Address for Control Plane does not work.

According to the preferred embodiment, a GGSN supporting both IPv6 and IPv4 adds both IPv6 address and IPv4 address to CDRs (Call Detailed Records) created for a PDP context, i.e. to G-CDRs. The SGSN may add either one IP address, i.e. GGSN Address for Control Plane, or two IP addresses, i.e. GGSN Address for Control Plane and Alternative GGSN Address for Control Plane, to the CDRs created for the PDP context, i.e. to S-CDRs. This way, it is possible for the CGF (Charging Gateway Functionality) to correlate CDRs created by the GGSN (including both IPv6 address and IPv4 address) and CDRs created by the SGSN(s) (including either one IP address, IPv6 or IPv4, or including both IPv6 address and IPv4 address).

In addition to charging, correlation may be needed e.g. for lawful interception or CAMEL messages or information. In general, any message or information generated by multiple nodes can be correlated based on the address and alternative address information. For lawful interception correlation, GGSN sends both IPv6 address and IPv4 address, whereas SGSN may send either one IP address, i.e. GGSN Address for Control Plane, or two IP addresses, i.e. GGSN Address for Control Plane and Alternative GGSN Address for Control Plane. GGSN thus sends both IPv6 address and IPv4 address, whereas SGSN may send either IPv6 address or IPv4 address or both for lawful interception correlation. This way, it is possible to correlate e.g. lawful interception information created by GGSN for the PDP context and lawful interception information created by SGSN(s) for the PDP context.

It is noted that the present invention can be implemented in any cellular network to provide address backward compatibility or message correlation function, when an address information is transferred between network nodes. The names of the various functional entities, signaling messages and information elements used in the context of the preferred embodiment are not intended to limit or restrict the invention. The preferred embodiments may thus vary within the scope of the attached claims.

The invention claimed is:

1. A method comprising:
   when a connection point at one end of a connection is changed from a first network node to a second network node of a cellular network, receiving at said second network node an address information and at least one alternative address information in a signaling message;
   selecting one of said address information and said alternative address information at said second network node, wherein said address information and said alternative address information comprise at least one of: a user address and network addresses, and wherein said address information and said alternative address information comprise at least one of: an IPv4 address and an IPv6 addresses; and
   using said selected address information for re-establishing said connection towards a third network node at the other end of said connection.

2. The method according to claim 1, wherein, when establishing said connection, transmitting possible addresses to be used for this connection as said address information and said at least one alternative address information in a signaling message from said first network node to said third network node, and addresses of said third node are stored in said first network node.

3. The method according to claim 1, where said address information can be used to address a node according to an old addressing or network, used before the transition, and said alternative address information can be used to address a node according to the new addressing or network.

4. The method according to claim 1, wherein said signaling message is sent as part of a location or routing area update message or a relocation procedure, and wherein said signaling message comprises a general packet radio services tunneling protocol (GTP) message.

5. The method according to claim 1, wherein said first and second network nodes comprise serving general packet radio services support nodes (SGSNs), and said third network node comprises a gateway general packet radio services support node (GGSN).

6. The method according to claim 1, wherein said address information and said alternative address information are transmitted in respective predetermined fields of said signaling message, and wherein said predetermined fields are provided in a packet data protocol (PDP) context information field.

7. The method according to claim 1, wherein said alternative address information is coded as an optional information so that a network node not supporting said alternative address information ignores the alternative address information, and wherein said connection is re-established with an old addressing mechanism based on said address information if said second node ignores said alternative address information.

8. A system comprising:
   a first network node configured to transmit an address information and at least one alternative address information in a signaling message if a connection point at one end of a connection is changed from said first network node; and
   a second network node configured to receive said signaling message if said connection point is changed to said second network node;
   selecting one of said address information and said alternative address information, wherein said address information and said alternative address information comprise at least one of: a user address and network addresses, and wherein said address information and said alternative address information comprise at least one of: an IPv4 address and an IPv6 addresses;
   and using said selected address information for re-establishing said connection towards a third network node at the other end of said connection.

9. The system according to claim 8, wherein said first and second network nodes comprise serving general packet radio services support nodes (SGSNs) of a general packet radio services (GPRS) backbone network, and wherein said third network node comprises a gateway general packet radio services support node (GGSN) of said general packet radio services (GPRS) backbone network.

10. An apparatus comprising:
    a receiver configured to receive a message if a connection point at one end of a connection is changed from another network node to said apparatus;
    a selector configured to select one of an address information and an alternative address information provided in said message, wherein said address information and said alternative address information comprise at least one of: a user address and network addresses, and wherein said address information and said alternative address information comprise at least one of: an IPv4 address and an IPv6 addresses; and
    a connection establisher configured to use said selected address information to re-establish said connection towards a third network node at the other end of said connection.

11. The apparatus according to claim 10, wherein said apparatus is configured to at least one of: receive data and signaling using one of: said address information and said alternative address information.

12. The apparatus according to claim 10, wherein said apparatus comprises a gateway general packet radio services support node (GGSN).

13. The apparatus according to claim 10, wherein said connection establisher is configured to transmit possible addresses to be used for said connection as said address information and said at least one alternative address information in a signaling message from said first network node to said third network node, and further comprising storing addresses of said third node in said first network node.

14. The apparatus according to claim 13, wherein said address information and said alternative address information are transmitted in respective predetermined fields of said signaling message, and wherein said predetermined fields are provided in a packet data protocol (PDP) context information field.

15. The apparatus according to claim 10, wherein said alternative address information is coded as an optional information so that a network node not supporting said alternative address information ignores the alternative address information, and wherein said connection establisher is configured to re-establish said connection with an old addressing mechanism based on said address information if said second node ignores said alternative address information.

16. A computer program embodied on a non-transitory computer-readable storage medium, the computer program configured to control a processor to perform operations comprising:

when a connection point at one end of a connection is changed from a first network node to a second network node of a cellular network, receiving at said second network node an address information and at least one alternative address information in a signaling message;

selecting one of said address information and said alternative address information, wherein said address information and said alternative address information comprise at least one of: a user address and network addresses, and wherein said address information and said alternative address information comprise at least one of: an IPv4 address and an IPv6 addresses; and using said selected address information for re-establishing said connection towards a third node at a second end of said connection.

* * * * *